Dec. 7, 1948.   G. E. FRANCK   2,455,667
COUPLING FOR HIGH-PRESSURE TUBING
Filed July 15, 1944   2 Sheets-Sheet 1

INVENTOR.
George E. Franck.
BY
Vernon D. Beehler
Atty.

Dec. 7, 1948.  G. E. FRANCK  2,455,667
COUPLING FOR HIGH-PRESSURE TUBING
Filed July 15, 1944  2 Sheets-Sheet 2
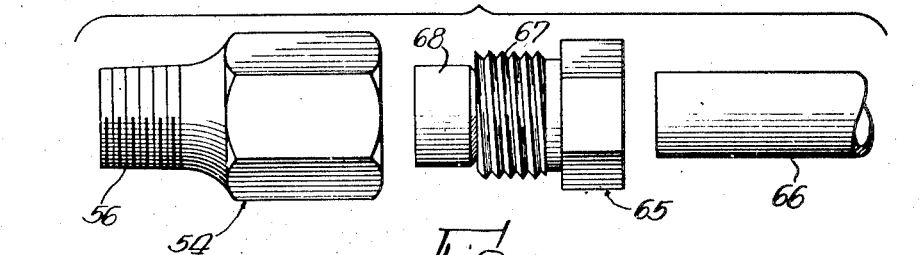
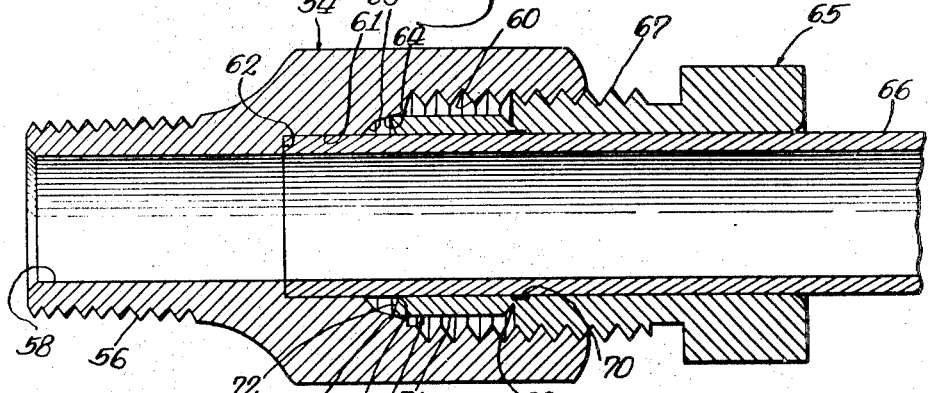
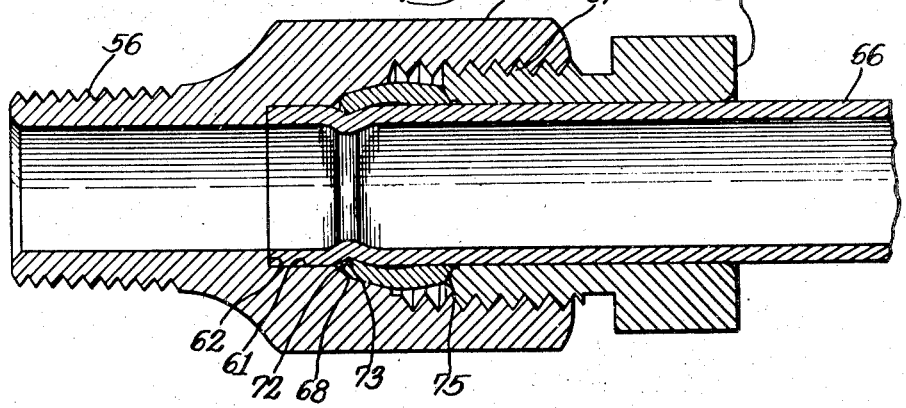
INVENTOR.
George E. Franck.
BY Vernon D. Beehler
Atty.

Patented Dec. 7, 1948

2,455,667

UNITED STATES PATENT OFFICE 2,455,667

COUPLING FOR HIGH-PRESSURE TUBING

George E. Franck, Riverside, Ill., assignor to The Imperial Brass Manufacturing Company, Chicago, Ill., a corporation of Illinois Application July 15, 1944, Serial No. 545,094

5 Claims. (Cl. 285—122)

My invention relates to couplings for tubing and particularly threaded couplings which are designed for connecting tubing in lines where relatively high pressures may be expected.

Among the objects of my invention is to provide a new and improved compression coupling which is simple in its construction by having the essential parts reduced substantially to a minimum and which is capable of use with relatively thin-walled tubing made of such materials as copper, aluminum, brass and other materials which may be used for the same or similar purposes.

Another object of my invention is to provide a new and improved compression type coupling for tubing wherein the parts are designed to be threaded together and which includes a sleeve so constructed that when compressed between the threaded parts of the coupling it will be deflected so that there is in effect a line contact between the sleeve and the tube producing an effective seal against high pressures carried within the tubing.

Still another object of my invention is to provide a new and improved compression coupling featuring a threaded body and nut so constructed that when threaded together they compress a sleeve element in such a manner that upon the initial threading together of the parts the sleeve is pressed only gently against the tube but wherein as the coupling parts continue to be threaded together the sleeve is pressed with a definite increasing force against the tubing.

A further object of my invention is to provide a new and improved high pressure coupling featuring a sleeve and a distorting recess for receiving the same so constructed that when the coupling parts are threaded together a mechanic can detect by the amount of torque required to rotate the parts when the sleeve has been driven into its proper deflecting relationship with the threaded coupling members.

A further object still is to provide in a coupling for holding high pressures a sleeve so designed that when compressed by the coupling bodies it will produce a line contact for holding a sealing joint at one end and will also press the other end of the sleeve against the tube to effect a secondary connecting area wherein relatively less pressure forces the sleeve against the tubing in order to prevent concentration of stress at one point should the sleeve be vibrated during use.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 4 is an exploded view in elevation showing a modified form of my invention.

Figure 5 is a longitudinal sectional view of the parts of the modified form prior to being tightened into place.

Figure 6 is a longitudinal sectional view of the modified form showing the parts coupled together into a made-up joint.

While it is true that a great variety of couplings have been devised for holding pipes and particularly copper tubing and while it is true also that a relatively large number of these have utilized a sleeve which is designed to be compressed upon the joint it has been found in practice that so great is the demand for couplings of this kind suited to a variety of newly developed needs that old couplings are found uniformly unsatisfactory for new uses.

With the development of new and high-powered machines necessitating the use of fluid under relatively high pressure, such as hydraulic pressure, for example, designers have resorted more and more to the use of relatively thin-walled tubing rather than to rigid pipes as was formerly the case. As thin-walled tubing continues to become acceptable it becomes necessary to replace tube couplings formerly designed for lighter pressures with couplings newly designed for holding high pressures. Also as a result of the development of new and high-powered machinery vibration factors have been greatly accelerated so that as old couplings are replaced the new designs must take the vibration factor into consideration which heretofore has been neglected.

Figure 1:
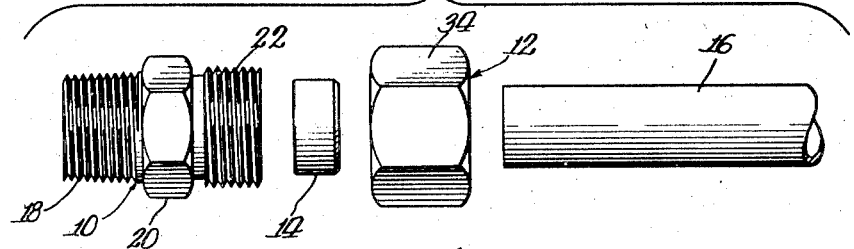
Figure 1 is an exploded view in elevation showing the various parts of a preferred form of my invention prior to their being applied to a tube.
Figure 2:
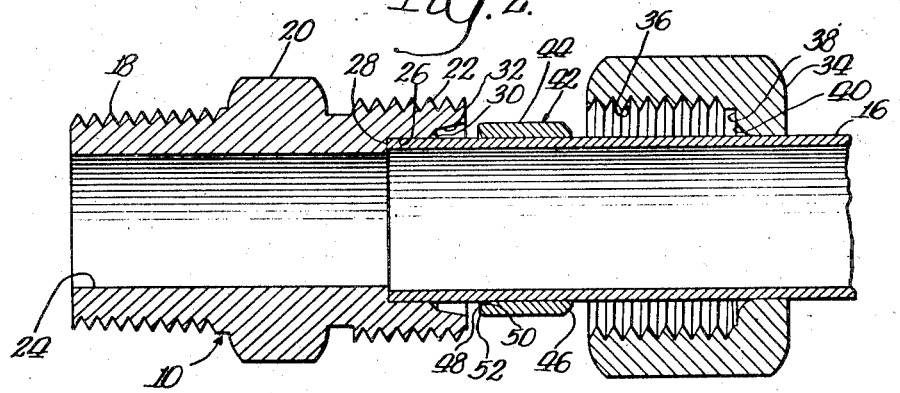
Figure 2 is a longitudinal sectional view of the parts of the coupling before being tightened into place.
Figure 3:
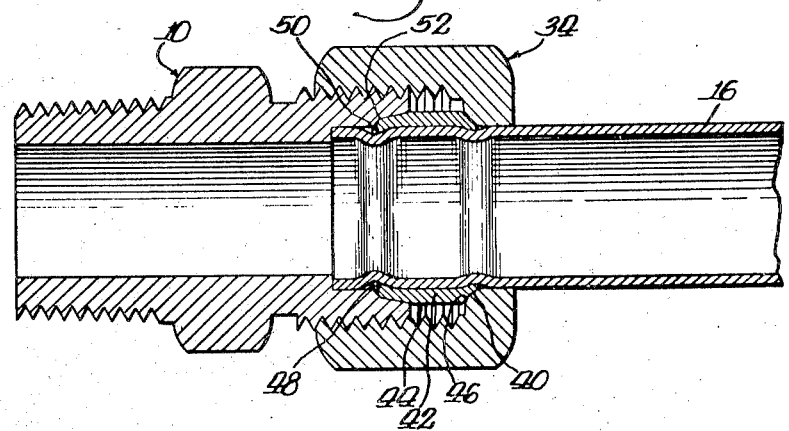
Figure 3 is a longitudinal sectional view of the coupling as made up.

In a preferred form of my device as illustrated in Figures 1, 2 and 3 there is provided a coupling comprising a body 10, a nut 12 and a sleeve 14 designed to couple a tube 16. The body as shown has a pipe threaded end 18, a hexagonal midportion 20 provided for a wrench-hold and a threaded end 22. A passage 24 extends through the body and at the right hand end as viewed in Figure 2 is provided with a flared enlargement comprising a cylindrical section 26 having a bottom or annular shoulder 28 for receiving the tubing. At the outer end the enlargement spreads to a dimension wider than the cylindrical portion. It should be noted that in the wider portion of the enlargement there is an inner flared portion 30 having a relatively sharp angle and an outer flared portion 32 which has an angle relative to the tube axis very substantially less than that of the flared portion 30. In practice it has been found that an angle of about 45° is suitable for the inner flared portion 30 and an angle in the neighborhod of 12° is suitable for the flared portion 32, although the precise angular relationship may not be critical.

The nut 12 is provided with a hexagonal portion 34 to provide a wrench-hold and has a threaded recess 36 and a bottom 38 for the recess. A rounded deflecting corner 40 is provided at the inner edge of the annular bottom 38.

For sealing the joint there is provided a sleeve 42 having a cylindrical mid-portion 44 and designed for a slidable fit over the tubing. At one end the sleeve has a tapered portion 46 sloping at an angle corresponding somewhat to that of the deflecting shoulder 40. At its other end the face of the sleeve 48 is cut back and defines at its inner edge 50 a corner and defines likewise at its outer edge a second corner 52. It should be noted that the outside diameter of the sleeve is very slightly less than the diameter of the mouth of the flared portion 32 so that the sleeve can be started into the flared portion before pressure is exerted on the threaded parts.

When the coupling is assembled as shown in Figure 3 the nut has been threaded upon the body and drawn tight. As the nut begins to be drawn up the cut-back end of the sleeve starts to enter the flared portion 32 of the recess in the body. While the sleeve is sliding along this gently sloped flare it is tightened very gradually upon the outside of the tube. When the end of the sleeve reaches a point where the slope of the recess changes abruptly, that is to say, where it is pressed against the sharply sloping inner flared portion the cut-back end of the sleeve is forced more abruptly toward the surface of the tubing. The tendency is to double the cut-back end over a slight amount so that the inside corner 50 is pressed most sharply against the tube. This effects a line contact between the corner of the sleeve and the wall of the tube. The sleeve presses the tube inwardly a slight amount as shown and thereby clamps the tube within the coupling.

While the corner 50 is thus being forced into the tube the corner 52 seals itself against the sharply flared portion of the recess in the body. Also at the same time the opposite end of the sleeve is forced into contact with the deflecting shoulder 40 within the nut and this end of the sleeve likewise is deflected against the wall of the tubing but to a lesser extent than the opposite end.

When the joint is made up as described the mechanic can screw the parts together with apparent ease so long as an end of the sleeve is doing no more than to ride along the gently sloping flared portion of the recess. As soon as the sleeve hits the sharply sloping portion there is a very marked increase in resistance to the threading together of the parts which immediately indicates to the mechanic that the coupling is complete.

Further, by reason of the fact that there is a double clamping effect between the sleeve and the tubing with the deflection being most pronounced at the point nearest the end of the tube and less pronounced at the end of the sleeve remote from the end of the tube there is provided a graduated grip upon the tube. As the tube is vibrated some of the vibration effect will be dampened by contact of the end of the sleeve which has the least pronounced grip whereas the remainder only of the vibration effect will be absorbed by the connection nearest the end of the sleeve.

In the modified form of my advice the sleeve is shown initially attached to the nut as illustrated in Figures 4 and 5. There is provided a hexagonal body member 54 having a threaded end 56 and a single aperture 58. At the other end of the body there is provided a threaded recess 60 having at the bottom an enlargement 61 and an annular shoulder 62 for receiving and positioning the tube. Between the enlargement 61 and the threaded recess 60 there is a flange portion 63 extending in an angular direction from the tube at a slope somewhere in the neighborhood of 45°. A second flanged portion 64 having a relatively gentle slope is located between the flange portion 63 and the threaded recess 60.

Cooperable with the body is a nut 65 which has a sliding fit over the tube 66, the nut being provided with a threaded extension 67. At its left hand end as shown in Figure 5 the nut has a sleeve 68 attached to the nut by a very short annular neck of metal 69. An annular recess 70 is provided adjacent the apex of the V-shaped slot which locates the neck of metal 69.

The mid-portion 71 of the sleeve may have an exterior slightly smaller than the outside diameter of the mouth of the gently sloping flared portion 64. As in the preferred embodiment the sleeve has an inwardly sloping end 72 defining an inner corner 73 and an outer corner 74.

Initially the outside diameter of the cylindrical sleeve is small enough so that the end will fit into the outside end of the flared portion of the body recess. As the coupling members are screwed together to the position shown in Figure 6 the connection between the sleeve and the nut breaks. By reason of there being a slope to the right end of the sleeve as shown in Figures 5 and 6 the end of the nut tends to ride up the slope and press the adjacent end of the sleeve into the tubing to a slight extent. The parts then assume the relationship shown at 75 in Figure 6.

At the other end the sleeve first enters the outer portion of the flare where it grips the tube lightly and is then driven against the sharply sloped portion of the flare where it is turned over into contact with the tube. The relative position of the parts is then as shown in Figure 6. In this position the inner edge 73 bears against the tube in substantially a line contact whereas the opposite corner 74 of the sleeve engages in sealing relationship with the wall of the recess in the body. A mechanic in tightening up this joint is able to "feel" the contact being made the same as in the preferred embodiment. Once the sleeve is driven into place it makes a good permanent connection with the tube which will hold tight at high pressures.

There has thus been provided a coupling for high pressure tubing which is designed to utilize a sleeve having a blunt end in such a way that the end can be turned over so that one of it edges is forced into a line contact with the tubing thereby effecting a seal at this point and providing a second seal where the outer edge of the sleeve is compressed against the adjacent flared portion of the adjacent recess.

I claim as my invention:

1. A coupling for tubing comprising one member having a threaded recess, a convex deflecting corner at the bottom of the recess, a sleeve having a sliding fit on the tube, a tapered edge at one end corresponding to the deflecting corner, the other end of the sleeve having a conical undercut providing an end face forming an obtuse angle with the inner surface of the sleeve, and a second member threaded for reception of the first member, said second member including a flared enlargement comprising an inner conical portion having a relatively sharp slope relative to the tube wall and an outer conical portion adjoining the inner portion having a relatively gentle slope relative to the tube wall.

2. A coupling for tubing comprising a nut having a threaded end, a sleeve attached to said end by a thin frangible section of metal, said sleeve having the attached end thereof sloping outwardly and away from the nut, the other end of the sleeve being of substantially the same radial thickness as the mid-portion thereof, having a face sloping inwardly from the end to form an obtuse angle with the axis of the sleeve measured through the sleeve, a sealing corner at the inside edge and a corner at the outside edge, and a body having a threaded portion adapted to receive the nut, a compound tapered recess in the body comprising an inner portion forming a relatively sharp slope with the tube axis and the outer portion thereof forming a relatively gentle slope with the tube axis.

3. A coupling for tubing comprising a nut having a threaded end, a sleeve having a substantially cylindrical mid-portion and attached to said end by a thin frangible section of metal, said sleeve having the attached end thereof sloping outwardly and away from the nut, the other end of the sleeve being of the same thickness as the mid-portion thereof and having an inwardly sloping face terminating in a blunt sealing corner at the inside edge and a relatively sharper corner at the outside edge, and a body having a threaded recess adapted to receive the nut, a shoulder at the bottom of the recess for abutting the tubing and a compound tapered enlargement adjacent the shoulder having the inner portion thereof forming a relatively sharp slope relative to the tube axis and the outer portion thereof forming a relatively gentle slope relative to the tube axis.

4. A coupling for tubing comprising a pair of members threaded for engagement one partially within the other, each of said members being axially bored with one of the members having an enlarged recess terminating in a shoulder limiting insertion of a piece of tubing therein and the other of said members permitting passage of the tubing completely therethrough, the recessed member having spaced axially outwardly of the shoulder therein means for deflecting inwardly an element pressed thereagainst, and a sleeve having an end, adapted to be received in the recessed one of said members, which is undercut to provide a uniformly inwardly sloping end face forming an obtuse angle with the inner surface of said sleeve, the leading end of said sleeve upon engagement with said deflecting surface being turned radially inwardly to effect sealing contact of the inner corner of the sleeve with the tubing without shearing the tubing.

5. A coupling for tubing comprising a nut having a threaded portion, a recess and a shoulder thereon adjacent the threaded portion, a body having a threaded portion engaging said nut when in assembled relation, said body having a recess comprising an inner end having a slope at one angle relative to the tube wall and an outer end having a slope at a lesser angle relative to the tube wall, and a sleeve having at the end received in said body an inwardly sloping end face forming an obtuse angle with the inner surface of the sleeve and a blunt annular corner at the intersection of the end face and the inner surface, said sleeve in assembled relation of the coupling having its end relatively sharply deflected inwardly by the sharp angle slope to force the inner blunt corner of the sloping end of the sleeve into the tube to form a sealing line contact about the surface of the tube without rupturing the surface of the tube and a portion of said sleeve adjacent the gentle slope of the recess having a secondary deflection against the tube.

GEORGE E. FRANCK.

REFERENCES CITED

The following references are of record in the file of this patent:

UNITED STATES PATENTS

| Number | Name | Date |
|---|---|---|
| 1,889,778 | Dobrick | Dec. 6, 1932 |
| 1,989,674 | Boas | Feb. 5, 1935 |
| 2,230,116 | Kreidel | Jan. 28, 1941 |
| 2,394,351 | Wurzburger | Feb. 5, 1946 |

FOREIGN PATENTS

| Number | Country | Date |
|---|---|---|
| 528,306 | Great Britain | Oct. 25, 1940 |
| 605,414 | Germany | Nov. 10, 1934 |
| 704,158 | France | Feb. 17, 1931 |